United States Patent [19]
Heijst

[11] 3,841,357
[45] Oct. 15, 1974

[54] PIPING BETWEEN A BUOY AND A STATIONARY CONDUIT

[75] Inventor: Willem Jan Van Heijst, St. Leon, Monaco

[73] Assignee: N.V. Industrieele, Handelscombinatie, Netherlands

[22] Filed: Feb. 21, 1973

[21] Appl. No.: 334,214

[30] Foreign Application Priority Data
Mar. 10, 1972  Netherlands .................. 7203231

[52] U.S. Cl. .................................. 138/120, 9/8 P
[51] Int. Cl. ............................................. F16l 11/00
[58] Field of Search ............ 138/120, 178; 285/163, 285/164; 9/8 P

[56] References Cited
UNITED STATES PATENTS
| | | | |
|---|---|---|---|
| 486,986 | 11/1892 | Schinke | 138/120 |
| 1,138,281 | 5/1915 | Dodge | 285/164 |
| 3,472,032 | 10/1969 | Howard | 9/8 P |
| 3,479,673 | 11/1969 | Manning | 9/8 P |

FOREIGN PATENTS OR APPLICATIONS
| | | | |
|---|---|---|---|
| 209,839 | 1/1924 | Great Britain | 285/163 |
| 1,089,225 | 9/1960 | Germany | 138/120 |

Primary Examiner—James J. Gill
Assistant Examiner—Anthony V. Ciarlante
Attorney, Agent, or Firm—Young and Thompson

[57] ABSTRACT

An improved connection between a buoy and a stationary underwater conduit comprises two rigid tubes the upper of which is more nearly vertical than the lower. The tubes are flexibly connected with the buoy and the conduit and each other by means of cardan joints. In addition, the lower tube is provided with a single joint whose axis lies in the vertical plane of the lower tube and is preferably perpendicular to the axis of the lower tube and is preferably disposed close to the cardan between the two tubes. Flexible hoses interconnect the parts adjacent the joints.

3 Claims, 1 Drawing Figure

PATENTED OCT 15 1974　　　　　　　　　　　　　　3,841,357
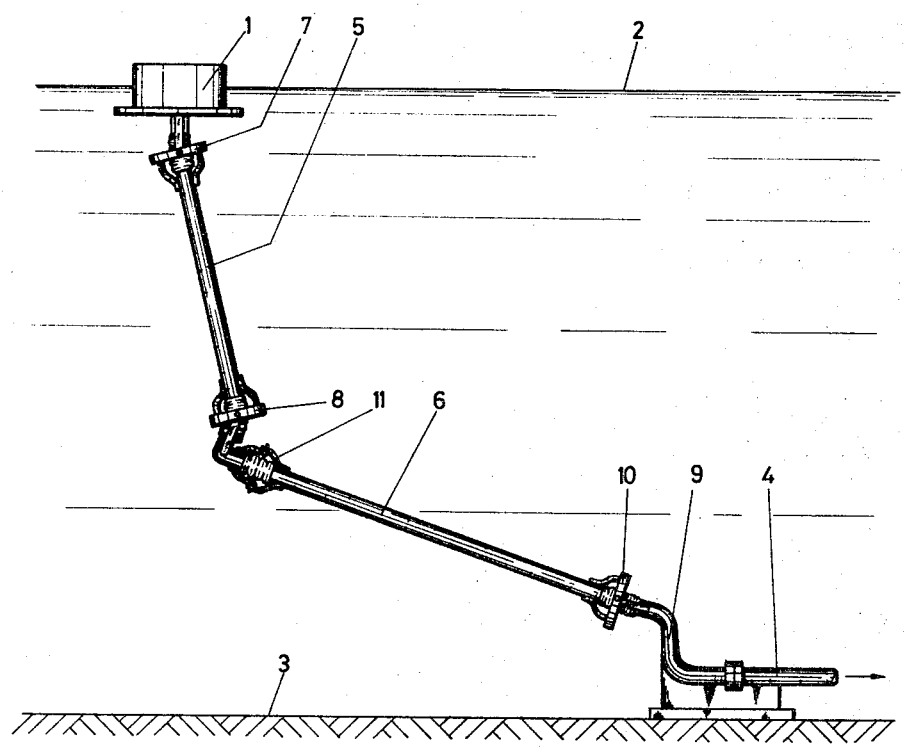

PIPING BETWEEN A BUOY AND A STATIONARY CONDUIT

The present invention relates to piping between a buoy and a conduit anchored on the ocean-bottom or the like. It is customary to use a hose for this piping. The buoy being attached to anchors has a certain freedom of motion within the limits set by the anchor cables or chains, so that the buoy can undergo vertical, horizontal and rolling movements under the influence of tide, currents, wind, wave action and anchoring forces. Rotation about a vertical axis, however, hardly occurs; on the one hand the anchor forces act eccentrically and the necessary torsional forces are absent and, on the other hand, the large mass moment of inertia opposes fast torsion. If the horizontal and vertical movements occur transversely thereon, the hose is torsioned because the buoy itself does not rotate on its vertical axis. In practice, hoses cause a lot of difficulties. Not only do they have to permit the above-mentioned movements but also they have to resist the forces of the surrounding water due to those movements, the forces due to currents and waves in said water, as well as the influence of the media transmitted by the hose. In doing so, the hose is not allowed to kink and may not grate over the bottom.

The invention has for its object to provide an improved connection between a buoy and a stationary conduit. According to the invention, said object is achieved in that said piping comprises two rigid tubes, the upper one of said tubes running steeply downwards and the lower one running substantially more horizontally, said tubes being flexibly connected with the buoy and conduit by means of cardan joints and that in the lower tube a single joint is provided, the axis of which joint lies essentially in the vertical plane of the lower tube.

The cardan joints permit vertical movements of the buoy as well as movements in a direction towards the stationary conduit and away therefrom. By the fact that in the lower stiff tube a normal, single joint has been provided it is possible that transverse movements may take place without a torsion of the tubes.

The axis of the single joint is preferably perpendicular to the centre axis of the lower tube. This is the most simple and yet stable solution. The axis of the single joint lies preferably near the cardan joint between the two tubes.

According to the invention, in addition the connecting pipes may be mutually connected at the region of all joints by connecting hoses.

The invention will now be explained more in detail with reference to the drawing, which is a side elevational view of apparatus according to the invention.

Reference numeral 1 indicates a buoy at water-level 2 and a stationary conduit 4 on the ocean-bottom 3. The buoy 1 is attached in a known manner to e.g., four anchors by means of anchor cables (not illustrated), said anchors having been provided evenly around the buoy.

The connection between buoy 1 and conduit 4 is formed by two connecting pipes 5 and 6. The tube 5 is connected to the buoy 1 and tube 6 by means of cardan joints 7 and 8 respectively, and said tube 6 is connected with the S-shaped member 9 extending upwards of the conduit 4 by means of the cardan joint 10. A joint with a single pivot pin is present in the tube 6 at reference numeral 11, said pivot pin lying in the vertical plane of the conduit 4, which means in the plane of the paper. Motions of the buoy 1 in the plane of the paper are permitted only by the cardan joints 7, 8 and 10 respectively. Motions outside the plane of paper are allowed by the three cardan joints together with joint 11, without the buoy rotating therewith.

What is claimed is:

1. Piping between a buoy and a conduit anchored on the ocean bottom or the like, comprising two rigid tubes the upper of which is more nearly vertical than the lower, a cardan joint between the buoy and the upper tube, a cardan joint between the two tubes, a cardan joint between the lower tube and the conduit, a joint flexible about a single axis at one end of the lower tube, and flexible hoses connecting said tubes in the region of said joints.

2. Piping as claimed in claim 1, said single axis being perpendicular to the axis of said lower tube.

3. Piping as claimed in claim 1, said single axis being disposed adjacent said cardan between said tubes.

* * * * *

UNITED STATES PATENT OFFICE
CERTIFICATE OF CORRECTION

Patent No. 3,841,357   Dated October 15, 1974

Inventor(s) Willem Jan Van Heijst

It is certified that error appears in the above-identified patent and that said Letters Patent are hereby corrected as shown below:

On the cover sheet item [73] should read -- N. V. Industrieele Handelscombinatie Holland --.

Signed and sealed this 14th day of January 1975.

(SEAL)
Attest:

McCOY M. GIBSON JR.
Attesting Officer

C. MARSHALL DANN
Commissioner of Patents